United States Patent [19]
Bishop et al.

[11] Patent Number: 5,851,246
[45] Date of Patent: Dec. 22, 1998

[54] APPARATUS FOR GASIFYING ORGANIC MATERIALS

[75] Inventors: Norman G. Bishop, Houston, Tex.; Ricardo Viramontes-Brown, Garza Garcia, Mexico

[73] Assignees: Hylsa, S.A. de C.V., Monterrey, Mexico; GTS Duratek, Inc., Columbia, Md.

[21] Appl. No.: 486,371

[22] Filed: Jun. 7, 1995

Related U.S. Application Data

[63] Continuation-in-part of Ser. No. 158,195, Nov. 24, 1993, Pat. No. 5,425,792, which is a continuation of Ser. No. 879,608, May 7, 1992, abandoned.

[51] Int. Cl.$^6$ .................................................. C10B 1/10
[52] U.S. Cl. ........................ 48/122; 48/187; 48/189.5; 422/209; 422/233
[58] Field of Search .................. 48/122, 187, 189.5; 422/209, 233

[56] References Cited

U.S. PATENT DOCUMENTS

| | | | |
|---|---|---|---|
| 1,270,949 | 7/1918 | Hornsey | 48/203 |
| 1,677,758 | 7/1928 | Frank | 48/210 |
| 2,276,526 | 3/1942 | Von Fuchs et al. | 196/30 |
| 2,640,010 | 5/1953 | Hoover | 196/28 |
| 2,805,188 | 9/1957 | Josenhans | 48/210 |
| 2,978,998 | 4/1961 | Frankland | 110/18 |
| 3,193,496 | 7/1965 | Hartung | 208/212 |
| 3,471,275 | 10/1969 | Borggreen | 48/209 |
| 3,639,111 | 2/1972 | Brink et al. | 48/111 |
| 3,687,646 | 8/1972 | Brent et al. | 48/209 |

(List continued on next page.)

FOREIGN PATENT DOCUMENTS

| | | |
|---|---|---|
| 537244 | 2/1957 | Canada . |
| 1 206 335 | 6/1986 | Canada . |
| 0-011 037 A | 5/1980 | European Pat. Off. . |
| 0-292 987 A | 11/1988 | European Pat. Off. . |
| 27 48 785 | 5/1978 | Germany . |
| 27 51 007 | 5/1979 | Germany . |
| 29 25 620 A1 | 1/1981 | Germany . |
| 29 44 989 A1 | 5/1981 | Germany . |
| 632724 | 11/1978 | U.S.S.R. . |
| 721460 | 3/1980 | U.S.S.R. . |
| 0 227 880 | 1/1925 | United Kingdom . |
| 1 437 845 | 6/1976 | United Kingdom . |
| 2 087 424 | 5/1982 | United Kingdom . |
| 2 123 028 | 12/1982 | United Kingdom . |
| 2 202 547 | 9/1988 | United Kingdom . |

OTHER PUBLICATIONS

Processing of Plastic Waste and Scrap Tires into Chemical Raw Materials, Especially by Pyrolysis, Hansjöorg Sinn, Walter Kaminsky, and Jörg Janning, Angnew Chem. Int. Ed. Engl./vol. 15 (1976) No. 11, 660–672.

Pyrolytic Recovery of Raw Materials from Special Wastes, Collin, G., 1980 ACS. pp. 479–484.

Pyrolytische Rohstoff–Rückgewinnung aus unterschiedlichen Sonderabfällen in einem Drehtrommelreaktor, Collin, G., Grigoleit, G., Michel, E., Chem.–Ing. Tech 51 (1979) Nr. 3, S. 220–224 [See AS for translation].

*Primary Examiner*—Timothy McMahon
*Attorney, Agent, or Firm*—Frommer Lawrence & Haug LLP; A. Thomas S. Safford

[57] ABSTRACT

A process and apparatus for gasification of organic materials (typically incorporated in domestic and industrial wastes, including auto shredder residues) to produce useful synthesis gas (primarily CO & $H_2$) with effectively non-toxic ash residue by means of a preferably stoichiometric burner directed into a single stage reactor containing a tumbling charge thus heated to 650° to 800° C. (below the incipient fusion temperature of the charge) resulting in thermally cracking and gasifying the organic materials in the charge and reacting the complex hydrocarbons and gas evolved with the $CO_2$ and $H_2O$ generated by the burner by combustion of a fuel and oxygen-containing gas at a high flame temperature, typically 2500° to 3000° C.

19 Claims, 3 Drawing Sheets

U.S. PATENT DOCUMENTS

| | | | |
|---|---|---|---|
| 3,718,446 | 2/1973 | Brink et al. | 48/209 |
| 3,729,298 | 4/1973 | Anderson | 48/111 |
| 3,759,677 | 9/1973 | White . | |
| 3,761,568 | 9/1973 | Brink et al. | 423/207 |
| 3,788,244 | 1/1974 | Polsak et al. | 110/8 R |
| 3,817,724 | 6/1974 | Ellis et al. | 48/209 |
| 3,842,762 | 10/1974 | Sargent et al. | 110/14 |
| 3,848,548 | 11/1974 | Bolejack, Jr. et al. | 110/7 R |
| 3,874,116 | 4/1975 | White . | |
| 3,938,449 | 2/1976 | Frisz et al. | 110/8 C |
| 3,938,450 | 2/1976 | Jaronko et al. | 110/8 C |
| 3,963,426 | 6/1976 | Hand | 48/197 R |
| 3,990,865 | 11/1976 | Cybriwsky et al. | 48/197 |
| 4,017,273 | 4/1977 | Anderson | 48/209 |
| 4,028,068 | 6/1977 | Kiener | 48/209 |
| 4,030,895 | 6/1977 | Caughey | 48/111 |
| 4,042,345 | 8/1977 | Anderson | 48/209 |
| 4,063,903 | 12/1977 | Beningson et al. | 44/2 |
| 4,095,958 | 6/1978 | Caughey | 48/111 |
| 4,113,606 | 9/1978 | Mulaskey | 208/244 |
| 4,178,266 | 12/1979 | Burkert et al. | 48/190 |
| 4,204,947 | 5/1980 | Jacobson et al. | 208/243 |
| 4,235,676 | 11/1980 | Chambers | 202/118 |
| 4,268,275 | 5/1981 | Chittick | 48/111 |
| 4,308,103 | 12/1981 | Rotter | 202/117 |
| 4,318,713 | 3/1982 | Lee et al. | 48/203 |
| 4,359,949 | 11/1982 | Moore | 110/171 |
| 4,361,100 | 11/1982 | Hinger | 110/238 |
| 4,367,075 | 1/1983 | Hartwig | 48/89 |
| 4,378,974 | 4/1983 | Petit et al. | 48/197 R |
| 4,385,905 | 5/1983 | Tucker | 48/62 R |
| 4,414,002 | 11/1983 | Lucas et al. | 48/89 |
| 4,421,524 | 12/1983 | Chittick | 48/209 |
| 4,432,290 | 2/1984 | Ishii et al. | 110/346 |
| 4,436,532 | 3/1984 | Yamaguchi et al. | 48/209 |
| 4,441,892 | 4/1984 | Schuster | 48/197 |
| 4,458,095 | 7/1984 | Wingfield, Jr. et al. | 585/241 |
| 4,557,204 | 12/1985 | Faehnle | 110/346 |
| 4,591,362 | 5/1986 | Yudovich et al. | 48/197 |
| 4,640,681 | 2/1987 | Steinbiss et al. | 432/14 |
| 4,793,855 | 12/1988 | Hauk | 75/26 |
| 4,797,091 | 1/1989 | Neumann | 432/14 |
| 4,834,792 | 5/1989 | Becerra-Novoa | 75/35 |
| 4,840,129 | 6/1989 | Jelinek | 110/229 |
| 4,881,947 | 11/1989 | Parker et al. | 48/89 |
| 4,935,038 | 6/1990 | Wolf | 48/209 |
| 4,976,210 | 12/1990 | Dewald | 110/246 |
| 4,983,214 | 1/1991 | Bottinelli et al. | 75/387 |

APPARATUS FOR GASIFYING ORGANIC MATERIALS

This application is also a continuation-in-part of application Ser. No. 08/158,195 filed Nov. 24, 1993 now U.S. Pat. No. 5,42,792 which is a continuation of U.S. Ser. No. 07/879,608 filed on May 7, 1992, now abandoned. This application also incorporates by reference the concurrently filed application Ser. No. 08/486,372 now U.S. Pat. No. 5,656,044, filed Jun. 7, 1995, entitled Method and Apparatus for Gasification of Organic Materials. All the aforementioned applications have the same inventorship as the present application.

FIELD OF THE INVENTION

The present invention relates to a method and apparatus for producing reducing gases having a high content of hydrogen and carbon monoxide, commonly known as synthesis gas (or syngas), from solid organic residues. More particularly the invention relates to a method and apparatus for gasifying industrial and domestic wastes of several types, including the non-metallic residues of automobile scrap, known as Auto Shredder Residues (ASR) also called "fluff", garbage, municipal waste, plastic wastes, tire chips, residues from the petrochemical, polymer and plastics industries, and in general wastes of organic compounds (including even liquids such as used motor oil), to produce a gas having a high content of hydrogen and carbon monoxide (typically more than 50%, or even well over 65% on a dry basis) which can be utilized as raw material in other industrial processes, for example, to reduce iron ores to metallic iron in the ironmaking processes known as Direct Reduction processes, or to be utilized as a source of energy to run an internal combustion engine or to produce steam and/or electricity. In its broader aspects the disclosed method can be used for devolatilization of coal or of other such non-waste complex molecular sources of carbon and/or hydrogen.

BACKGROUND OF THE INVENTION

In these days, and primarily in the industrialized countries, there is a deep concern about the safe disposal of domestic and industrial wastes which have acquired great ecological importance. These wastes often include a substantial proportion of organic content.

Many such wastes often contain toxic substances and are nonbiodegradable. They cannot therefore simply be disposed of in landfills due to contamination problems of air and water. Another alternative to dispose of these wastes is incineration. Normal and simple incineration however is not permitted if the product gases are not duly cleaned because it causes air pollution with toxic chemicals for example, chlorine compounds and nitrogen oxides. In some countries, environmental laws and regulations have been passed which prohibit burial or incineration of these types of wastes. Therefore these alternatives for disposal of such wastes are now subject to many restrictions.

A thorough description of the problems which the shredding industry is facing regarding disposal of fluff and some suggestions for utilization of the energy content of fluff, is found in a paper by M. R. Wolman, W. S. Hubble, I. G. Most and S. L. Natof, presented at the National Waste Processing Conference in Denver, Colo. held on 14 Jun., 1986, and published by ASME in the proceedings of said conference. This paper reports an investigation funded by the U.S. Department of Energy to develop a viable process to utilize the energy content of fluff. However, the process therein suggested is aimed to carry out a total incineration of the wastes, utilizing the heat from said incineration for steam production, while the present invention is addressed to producing from organic materials a high quality gas as an energy source.

It has also been proposed in the past to carry out a controlled combustion of the organic wastes and to utilize the heat or other values (such as process gases) released by such combustion. Such prior art processes typically gasify organic materials by one of two processes: pyrolysis, that is, thermal decomposition of the materials by indirect heating; or partial combustion of the materials with air or oxygen.

Energy consumption is one of the most important costs in ironmaking. Typical direct reduction processes consume from 2.5 to 3.5 Gigacalories ($10^9$ calories) per metric ton of product, known as sponge iron or direct reduced iron (DRI). Therefore, many processes have been proposed which utilize all types of available energy sources, such as coal, coke, liquid fuels, natural gas, reducing gases from biomass, nuclear energy and solar energy. Most of such proposals have not met practical success, sometimes because the materials and means needed are not yet available or because the relative costs for using such other energy sources are higher than for traditional fossil fuels.

Utilization of organic wastes as a source of energy for the ironmaking industry offers great economic advantages and solves environmental problems in those countries where large quantities of automobiles are scrapped or other wastes with high organic material content are generated. Metallic scrap is recycled for steelmaking. The nonmetallic residues of automobiles (fluff), however, had not been utilized to produce reducing gases useful in the production of iron or in other industrial processes.

SUMMARY OF THE INVENTION

Accordingly, it is an object of the present invention to provide a process and apparatus for producing reducing gases, also known as synthesis gas, preferably from low cost carbon/hydrogen sources such as garbage, or other organic containing wastes, which syngas can be utilized as raw materials in chemical processes and also as fuel.

Other objects of the invention will be described hereinbelow or will be evident to those readers skilled in the art.

The present invention comprises a process wherein gasification of organic materials is carried out by reaction of the thermally cracked complex hydrocarbons and gas evolved from said hot materials (preferably 650° to 800° C.), with carbon dioxide and water generated by combustion, preferably stoichiometric, of a fuel and oxygen at high flame temperature, typically at 2500° to 3000° C. (when using a tumbling reactor). The heat produced by the combustion of the fuel is transferred to the gasifiable materials not only by convection, but also by direct radiation from the flame and by tumbling contact with the glowing interior refractory lining of a rotary reactor. The burner(s) inside the reactor is balanced in positioning and capacity in such a way that it is capable of delivering the necessary heat for thermally decomposing the materials and also for carrying out the gaseous reactions of complex hydrocarbons with the water and carbon dioxide, as well as providing the necessary amount of $H_2O$ and $CO_2$ reactants for such reactions. These combustion products can contact the evolved gases such that the resulting synthesis gas contains less than about two percent by volume of gases with a molecular structure having more than two carbon atoms. Another feature of the present invention is that a high quality gas is obtained in a single stage or reaction zone, while the prior art processes typically require two stages. Complex gases within the reaction zone(s) react by dissociation according to their thermal/chemical equilibrium composition and become substantially stable simple hydrocarbon gases at lower temperatures.

Since one of the advantages of this invention is to supply a high quality process gas at a cost competitive with traditional process gases (such as reformed natural gas), it may be necessary in practicing the invention in one of its broader aspects and under certain market conditions and with certain kinds of "fluff" or similar waste materials to use a slight excess of oxygen (or air) in the burner or to the reactor to reduce the amount of natural gas used in the burner relative to the amount of organic waste gasified. Not so much excess oxygen should be used as to result in substantial incomplete gasification or in the need for separate two-stage processing (at two significantly different temperatures, with the second stage being in the absence of the solid burden). This excess oxygen for example might be up to 10% more oxygen relative to the molar content of the fuel. Excessive oxygen makes control of the process difficult and is safer if minimized. Alternatively, as economics may dictate, a portion of the previously generated synthesis gas may replace an equivalent amount of natural gas in the burner, up to 100 percent replacement.

Regarding the rotary reactor disclosed in the present invention, it comprises some unique characteristics, namely: the rotary reactor is disposed substantially horizontally with respect to its axis of rotation, while known rotary reactors are inclined so that the materials tumbling inside are caused to move from their charge end to their discharge end. In the rotary reactor of the present invention solids move from the charge end to the discharge end of the reactor by the tumbling action of the rotating vessel, and by the volumetric displacement of reacted solid ash in the bed by unreacted material and inert solids contained in the feed material. The center of the reactor has a bulged shape to give the bed an adequate volume and burden retention time and to conform to the shape of the burner flame.

The process could be carried out in other apparatus such as a generally cylindrical horizontal stationary reactor having internal slightly-angled rotating paddles for tumbling the burden. The latter has some drawbacks such as possible obstruction of the preferred single flame within the reactor chamber and the engineering problems of the paddles and supporting moving parts being within the high temperature regions of the reactor.

Another important feature of the present invention is the unique structure of the high temperature seals which minimize seepage of outside air into the rotary reactor.

Because the primary process burner is driven by oxygen and fuel (natural gas, syngas, fuel oil, coal, etc.) the nitrogen content of the resulting product gas is normally limited to the nitrogen contained in the organic feed materials; thus, the nitrogen content of the product gas is normally less than ten percent by volume.

A significant aspect of this invention is the mixing of the evolved complex hydrocarbon gases and entrained soot-laden dust particles exiting the reactor into and through the high temperature $CO_2$ and $H_2O$ laden recirculating vortex created in the reactor's atmosphere by the counter-current burner gas stream(s). The flame of the primary process burner preferably enters the reactor from a counter-current direction relative to the movement of the burden material.

The dust-laden gases generated by this process preferably pass out of the gasification reactor past the burner in a co-current direction relative to the movement of the bed of burden (ash plus gasifying materials).

In the preferred embodiment the reactor rotates on a horizontal axis. On the charge end of the reactor the feed tube to the burden serves the following purposes: (1) as a raw material feed input, and (2) as an atmospheric seal.

Raw material/feed is force-fed by appropriate means such as by a method of extrusion into the gasification reactor by an auger which is of standard commercial design; however, the diameter, length, and taper of the extrusion tube from the auger into the reactor, and the exact position and clearance between the extrusion tube and the rotating reactor have been determined by practice and provide a support for the rotating slip-seal design on the feed-end of the reactor. Solid feed material in the auger serves as part of the atmospheric seal on the feed-end of the reactor. The auger can also serve a shredding function for oversized pieces of feed material.

Another method for feeding raw material into the reactor involves a hydraulic ram system in which two sets of hydraulic rams act to compact and force feed the material through a specially designed feed tube.

The nature of the carbonaceous feed material consumed in this process is such that some of the feed material has extremely low melting and volatilization temperatures; for example, plastics, rubber, and oil/grease. Therefore, it is important that the temperature of the feed material be controlled to prevent premature reactions before the material reaches the inside of the gasification reactor. The design of the feed extrusion tube and the receiving shaft, or tube through which the feed material is injected and through which the atmospheric seal must be maintained are important parts of the design of this invention.

The process temperature must be controlled to prevent ash materials in the bed from reaching their temperatures for incipient fusion; thus, preventing the formation of agglomerates in the bed and on the wall of the reactor. The critical ash fusion temperature has been determined by practice for various types of raw feed materials (s). In the ideal practice of the art of this process it is important to maintain the highest possible bed temperature; however, the temperature of the bed should remain below the point of incipient fusion of the ash (hence the preferred 650°–800° C. range).

Non-reactive dust particles which become airborne pass out of the gasification reactor with the product gas into the hot gas discharge hood and then through hot ducts into a cyclone, venturi, or other appropriately adapted commercial equipment. The gas then passes through a packed-bed column where the acids are scrubbed from the gas and the wash water is adjusted to a Ph of about seven (7). The clean gas is then moved by compressor via pipeline to storage for use.

The design of the hot gas discharge hood is another important aspect of this invention. The hot gas discharge hood provides the port support structure for the process burner.

Secondary air/oxygen injector(s) may advantageously be located in the hot gas discharge hood and/or the hot cyclone for the purpose of adding air and/or oxygen to control the temperature of the product gas as it exits the hot gas discharge hood and/or to aid in "finishing" the gasification of any residual hydrocarbons or soot. In practice of this process it is important to maintain the temperature of the product gas at a sufficiently high level until the gas reaches the gas scrubber in order to avoid condensation of any remaining higher molecular weight gases exiting through the hood. The added residence time of the product gas in the hot gas discharge hood and the hot ducts and cyclone leading to the gas scrubber is such as to increase reaction efficiencies between gases and the carbonaceous portion of the dust.

By controlled additions of air and/or oxygen to the hot gas discharge hood, both the temperature and pressure in the discharge hood can be better managed. It has been found that by raising the temperature of the product gas to about 700° C. by the injection of about 5 percent by volume of oxygen, the residual complex hydrocarbon gases are predominantly decomposed into carbon monoxide and hydrogen. Ideally, such additions are minimized in order to maintain the quality of the synthesis gas. However, the differing types of burden require adjustments to give the required flexibility to the process. Where the type of burden is not standardized, such flexibility can be accomplished by adjusting the amount of air and/or oxygen additions. The amount of air and/or oxygen added in the hot gas discharge duct must also be controlled in view of the BTU requirements of the product gas being produced. For example: if the content of nitrogen in the product gas is not critical relative to the end use of the gas, air can be used exclusively to control the temperature and pressure in the hot gas discharge hood. However, if the content of nitrogen in the process gas must be maintained at a low level in order to meet the required BTU specifications for the gas, oxygen can be used instead of air.

Because the synthesis gas produced by this process is naturally high in particulate matter and acid gases, the sensible energy of the gas cannot be easily utilized by heat exchangers. On the other hand, the gas can be controlled to contain between about 1335 Kcal/m$^3$ and 3557 Kcal/m$^3$ (150 and 400 BTU/cubic foot) and can be easily scrubbed of particulate matter and acids.

Ash discharged directly from the reactor and from the hot cyclone is very low in leachable metals. This ash does not require further treatment to be disposed of in an environmentally safe manner. Dust remaining in the product gas following the hot cyclone is removed in a wet venturi scrubber and recovered from the wash water as a sludge. This sludge may be relatively high in leachable metals and therefore may require treatment for environmentally safe disposal.

DETAILED DESCRIPTION OF PREFERRED EMBODIMENTS

Figure 1:
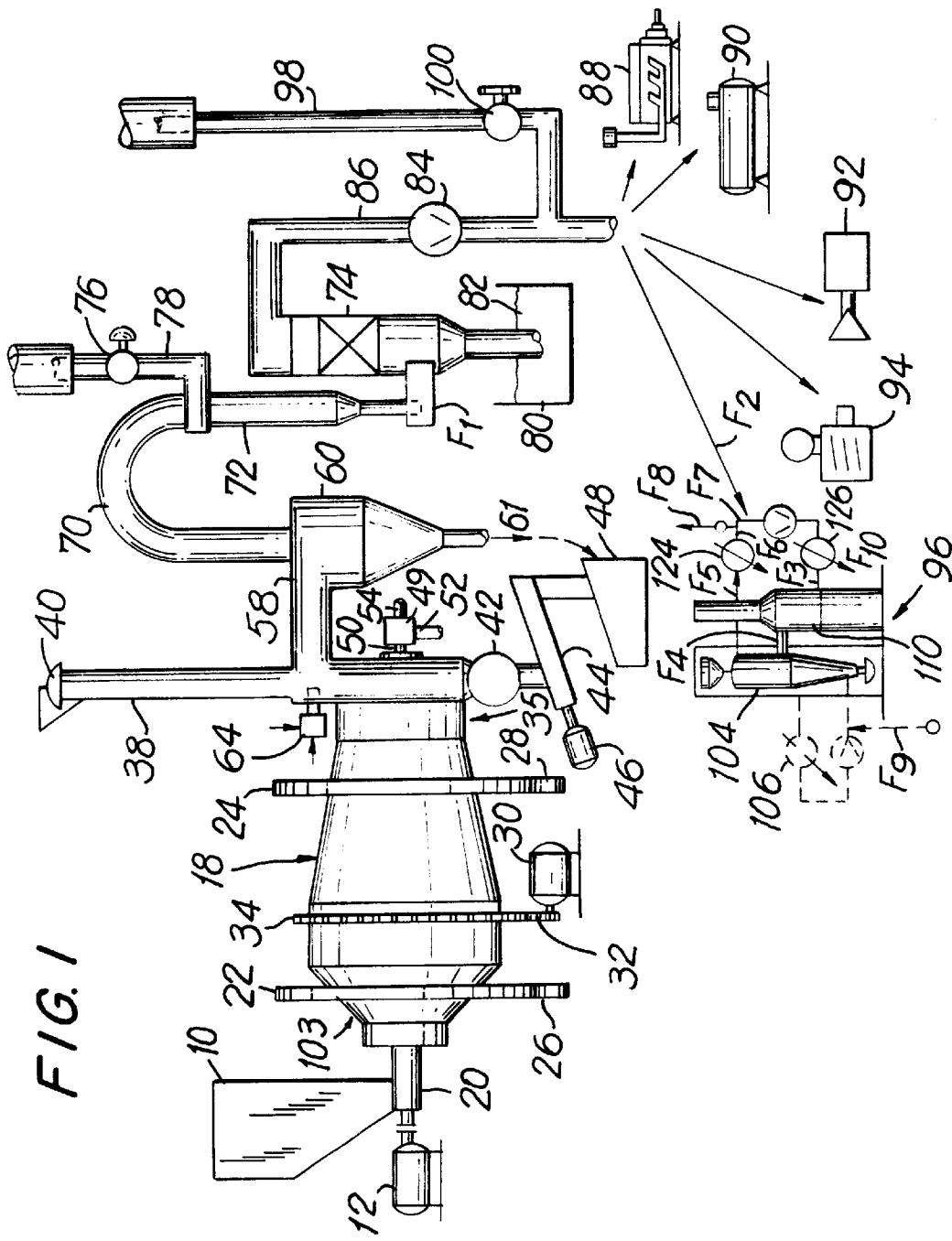
FIG. 1 shows a partially schematic diagram of a preferred embodiment of the present invention useful for gasifying organic wastes to yield a synthesis gas and showing a number of exemplary end uses for such gas.

A preferred embodiment of the invention as applied to the gasification of fluff will be described with reference to the appended drawings wherein common elements are designated by the same numerals in all the figures for easier reference. Referring to FIG. 1, showing a partially schematic diagram of the general process and apparatus, numeral 10 designates a charging hopper wherefrom fluff is introduced into the gasification reactor 18 by an auger feeder 20 having an auger 14 (shown in FIG. 2) driven by a motor 12.

Reactor 18 is of the rotary type and is provided with riding rings 22 and 24 which rest and roll on support rolls 26 and 28. Motor 30 causes reactor 18 to rotate about its horizontal axis by means of a suitable transmission device 32, for example of the type of chain and sprocket ring 34, in a manner known in the art.

The discharge end 35 of reactor 18 debouches into a gas collecting hood 36 having at its upper portion an emergency stack 38, through which the product gases can flow by safety valve 40, and a lower discharge section for collection of the solid residues or ash resulting from gasification of the fluff. Rotary valve(s) 42 is provided for regulation of solids discharge and contributes to prevent combustible gas from leaking to the outer atmosphere. Screw-type conveyor 44 driven by motor 46 cools the ash and transfers it into receiving bin 48 for disposal.

A burner 49 is positioned generally horizontally through hood 36 with its nozzle 50 reaching the interior of reactor 18 in the manner shown and described with reference to FIG. 2. Fuel gas and oxygen are fed to burner 49 through conduits 52 and 54.

From hood 36, the gases produced by reactor 18 are transferred through take off conduit 58 into a hot cyclone 60. The solid fine particles of fluff or soot 61 which may be entrained by the gases from reactor 18 are separated and are collected, cooled, and discharged into receiving bin 48.

A secondary burner 64, fed with oxygen/air and/or fuel gas, is positioned upstream of cyclone 60 for optional addition of air or oxygen to gasify any hydrocarbons or soot in the form of fine particles or gases which may reach that point. This "finishing" secondary gas stream from the secondary injector 64 is directed into the take off conduit 58 (which can be thus seen to function as a secondary reactor 58).

The raw product gas flows through conduit 70 into a wet venturi scrubber 72 where entrained dust particles are removed. The product gas then passes through packed bed tower 74 where acids are removed by water wash. Emergency pressure control valve 76 is provided at purge line 78 to relieve excess pressure in the system should upset conditions occur. Solids collected by scrubber 72 are sent into sludge tank 80 forming a sludge 82.

Clean and cool product gas flows to compressor 84 through pipe 86, connected to a flare stack 98 provided with valve 100 for disposal of excess gas surges.

The product gas can be utilized for a variety of purposes. For example, the high quality clean product gas can produce mechanical power as a fuel for an internal combustion engine 88, or can be stored in tank 90 for later use (e.g. to be burned for its heat content), or used to produce electricity in a. gas turbine generator 92, or to produce steam in boiler 94 or to be used as a reducing gas in a direct reduction process 96.

Figure 2:
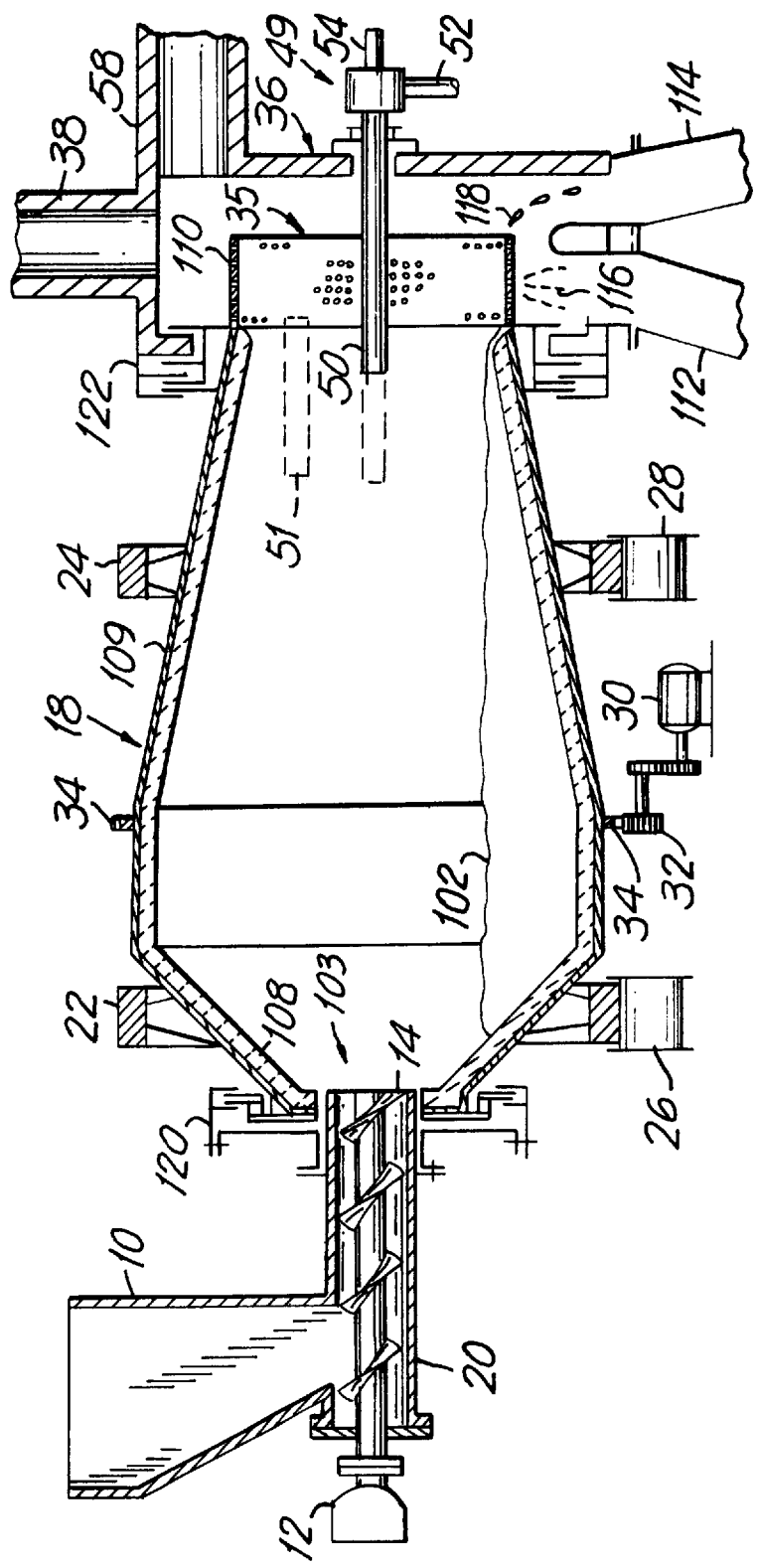
FIG. 2 shows a partially schematic vertical cross section in more detail of a rotary reactor of the type illustrated in FIG. 1.

Referring now to the more detailed drawing of the gasification reactor 18 shown in FIG. 2, the bed of material 102 to be gasified is formed in this primary reactor 18, and solids are caused to move from the charge end 103 to the discharge end 35 by tumbling action induced by rotation of reactor 18 and by the volumetric displacement of reacted solid ash in the bed 102 by unreacted and inert solids contained in the feed material delivered by auger feeder 20. The tumbling and mixing action of hot reacted and inert ash with fresh unreacted solids in the feed material greatly increases the rate of heat transfer in the bed 102 and thus enhances the rate and completeness of gasification of the raw feed material.

The depth of bed 102, and the retention time for feed material in reactor 18, are determined by the diameter and length of the reaction zone and are also relative to the length, diameter, and the angle of the slope of reactor 18 leading to discharge end 35.

A horizontal rotation axis is preferred among other reasons because the seals 120 and 122, located at the periphery of reactor 18 generally at its charge end 103 and discharge end 35, do not have to withstand excessive thrust or strain due to uneven distribution of the center of gravity of reactor 18. This also applies to the support rolls 26 and 28, which are of a simpler design and easier to maintain if reactor 18 rotates horizontally.

In one of the preferred embodiments, the shape of this primary reactor 18 is an important feature of this invention because the hot volatile gases which evolve from the bed of material 102 must be brought immediately into contact with the extremely hot products of combustion ($CO_2+H_2O$) from burner 49, in order to more directly absorb the high temperature energy of the flame via the endothermic reactions of complex gases to form gases of simpler compounds. The shape and length of the flame from burner 49 is such that volatile gases which evolve from the bed 102, and over the entire length of reactor 18, react with the high temperature products of the combustion from burner 49. These combustion products preferably contact the evolved gases such that the resulting synthesis gas contains less than about two percent by volume of gases with a molecular structure having more than two carbon atoms.

Reactor 18 is provided with refractory lining 108 in the manner known in the art. Refractory lining 108 contributes to a uniform and efficient heating of bed 102 because the exposed portion of refractory lining 108 receives heat from the flame by radiation and also by convection. The lining 108 includes a typical intermediate insulation layer 107 (shown in FIG. 3) as a thermal protection to the metallic shell 109 of the reactor 18. Uniform and efficient absorption of the high temperature energy from burner 49 by bed 102 also depends upon the rotation speed of reactor 18 and is necessary to prevent overheating of areas of bed 102 which are exposed directly to the heat of the flame, as well as to prevent overheating refractory lining 108. If uncontrolled overheating of bed 102 and/or refractory lining 108 should occur, fusion and/or melting and agglomeration of ash-to-ash and/or ash-to-refractory lining 108 could result in damage to refractory lining 108.

A second burner 51 has been shown in dashed lines to illustrate an alternative embodiment having a plurality of burners. However, in the preferred embodiment only a single burner 49 is used.

Adjustable positioning of nozzle 50 of burner 49, shown in solid and dotted lines, inside reactor 18 is an important feature for optimal operation of the process. The preferred position of nozzle 50 will be such that an effective reaction between the gases evolved from bed 102 and the oxidants produced by the flame of burner 49 is accomplished. The flame causes a vortex near the discharge end 35 of reactor 18 and the gases evolving from bed 102 must pass by or through the influence zone of the flame. This arrangement results in the production of a high quality gas in a single reaction zone.

The discharge end 35 of reactor 18 is provided with a foraminous cylinder 110 for screening of fine and coarse solid particles of ash discharged from reactor 18. The fine particles 116 and coarse particles 118 are collected through conduits 112 and 114, respectively, for disposal or further processing.

Burner 49 in this preferred embodiment is operated stoichiometrically to minimize the direct oxidation of the material in bed 102 inside reactor 18.

Seals 120 and 122 are provided to substantially prevent uncontrolled introduction of atmospheric air into reactor 18. The design of seals 120 and 122 will be better appreciated with reference to FIG. 3. The design of reactor 18, (shape, length and horizontal axis rotation), results in minimal thermal expansion, both axial and radial. Seals 120 and 122 are specifically designed to absorb both axial and radial expansion, as well as normal machine irregularities, without damage while maintaining a secure seal.

The seals comprise a static U-shaped ring 130 seen in cross section supported by annular disk plate 132 which closes off the end of the reactor space 138 and in turn is attached by flange 134 to the outer housing structure of the auger feeder 20. A fixed packing 136 is provided to ensure that no gas leaks from space 138 which communicates with the interior of reactor 18 through annular space 140.

Two independent annular rings 142 and 144, made of stainless steel, are forced to contact the static U-shaped ring 130, by a plurality of springs 146. Rings 142 and 144 are fastened to supporting annular plate 148 to form an effective seal between ring 142 and plate 148 by conventional fasteners 150. Supporting plate 148 is securely attached to member 152 which forms part of or is fixed to the outer shell of reactor 18.

Springs 146 maintain the sealing surfaces of rings 142 and 144 against the surface of static ring 130, in spite of temperature deformations or wear.

EXAMPLE NO. 1

A pilot plant incorporating the present invention was operated during many trial runs. The rotating kiln reactor is on the order of 4.3 meters long by 2.4 meters wide (14×8 feet) at its widest point and is shaped generally and has accessory equipment as illustrated in FIG. 1. The following data was obtained: Auto shredder waste from a shredder plant was fed to a rotary reactor as described in the present specification.

Typical analysis of the ASR material, (also called "fluff") which is the material remaining after metallic articles, such as auto bodies, appliances and sheet metal, are shredded and the metals are removed, is in weight percent as follows:

| | |
|---|---|
| Fiber | 26.6% |
| Fabric | 1.9% |
| Paper | 3.7% |
| Glass | 2.4% |
| Wood Splinters | 1.4% |
| Elastomers | 3.3% |
| Metals | 3.3% |
| Foam | 1.4% |
| Plastics | 12.5% |
| Tar | 3.6% |
| Wiring | 1.3% |
| Dirt/Other | 38.6% |
| TOTAL = | 100.0% |

It should be understood, however, that actual analyses vary in a wide range due to the nature and origin of this material. Depending on the shredding process, fluff contains a variable weight percentage of noncombustible (ash). Bulk density of fluff is approximately 448 kg/m$^3$ (28 lb/ft$^3$). In general, noncombustibles account for about 50% by weight and combustible or organic materials account for about 50%.

About 907 kg/hr (2000 lb/hr) of fluff were fed to the rotary furnace by means of the auger-type feeder after a period of heat-up of the reactor, so that its interior temperature reached above 650° C. (1202° F.). During stable operation, the temperature in the reactor was more or less homogeneous and near 700° C. (1292° F.). Although the temperature of the flame may reach about 3000° C. (5432° F.), the endothermic reactions between the gases evolved from the hot fluff and the oxidants ($CO_2$ and $H_2O$) produced by the burner cause the interior reactor temperature in the bed and adjacent internal atmosphere to stabilize at about 700° C. (1292° F.).

The reactor was set to rotate at about 1 r.p.m. The burner was operated stoichiometrically using about 64.3 NCMH (2271 NCFH) of natural gas and 129 NCMH (4555 NCFH) of oxygen. A rate of 573 NCMH (20,235 NCFH) of good quality synthesis gas was obtained.

Typical analysis of the synthesis gas produced is:

|  | % Volume (dry basis) |
| --- | --- |
| $H_2$ | 33.50 |
| CO | 34.00 |
| $CH_4$ | 8.50 |
| $CO_2$ | 13.50 |
| $N_2$ | 5.50 |
| $C_2H_2$ | 0.75 |
| $C_2H_4$ | 3.50 |
| $C_2H_6$ | 0.75 |
| TOTAL: | 100.00 |

As can be readily observed, the product gas obtained contained 67.5% of reducing agents ($H_2$ and CO) and 13.5%. of hydrocarbons which in some applications for this gas, for example, in the direct reduction of iron ores, may undergo reformation in the direct reduction process and produce more reducing components ($H_2$+CO).

The heating value (NHV) of the product gas was about 3,417 $Kcal/m^3$ (384 $BTU/ft^3$), which corresponds to a medium BTU gas and may be used for example to fuel an internal combustion machine, and certainly can be burned to produce steam or for any other heating purpose. As a comparison, the gas effluents from blast furnaces have a heating value of about 801 TO 1068 $Kcal/m^3$ (90 to 120 $BTU/ft^3$) and even so are utilized for heating purposes in steel plants.

The amount of dry ash discharged from the reactor amounts to about 397 kg/hr (875 lb/hr) and additionally about 57 kg/hr (125 lbs/hr) were collected as sludge from the gas cleaning equipment.

The hot ashes collected directly from the reactor discharge port and from the hot cyclone are very low in "leachable" heavy metals, and consistently pass the TCLP tests without treatment. These ashes contain between eight and twelve percent recyclable metals, including iron, copper, and aluminum. The hot ashes are composed of iron oxides, silica, alumina, calcium oxide, magnesium oxide, carbon, and lesser amounts of other matter.

After removal of oversize metal pieces by screening, the remaining dry ash is environmentally safe for landfilling without further treatment. The toxicity analysis of the concentration of the eight RCRA metals in an extract obtained by TCLP tests is illustrated in the following table.

| Metals | Regulatory Concentrations (mg/L) | *TCLP Test Results (mg/L) |
| --- | --- | --- |
| Silver | 5.0 | <0.01 |
| Arsenic | 5.0 | <0.05 |
| Barium | 100.0 | 5.30 |
| Cadmium | 1.0 | <0.01 |
| Chromium | 5.0 | <0.05 |
| Mercury | 0.2 | <0.001 |
| Lead | 5.0 | <0.02 |
| Selenium | 1.0 | <0.05 |

*Toxicity Characteristics Leachate Procedure (per Resource Conservation & Recovery Act).

Dust solids collected from the gas scrubbing system are recovered as sludge and have been analyzed for the eight RCRA metals as illustrated in the following table:

| Metals | Regulatory Concentrations (mg/L) | TCLP Test Results (mg/L) |
| --- | --- | --- |
| Silver | 5.0 | <0.01 |
| Arsenic | 5.0 | 0.06 |
| Barium | 100.0 | 3.2 |
| Cadmium | 1.0 | 0.78 |
| Chromium | 5.0 | <0.05 |
| Mercury | 0.2 | <0.001 |
| Lead | 5.0 | 4.87 |
| Selenium | 1.0 | <0.07 |

Several TCLP tests have been made and in each case the sludge materials have passed the test without additional treatment.

EXAMPLE NO. 2

Figure 3:
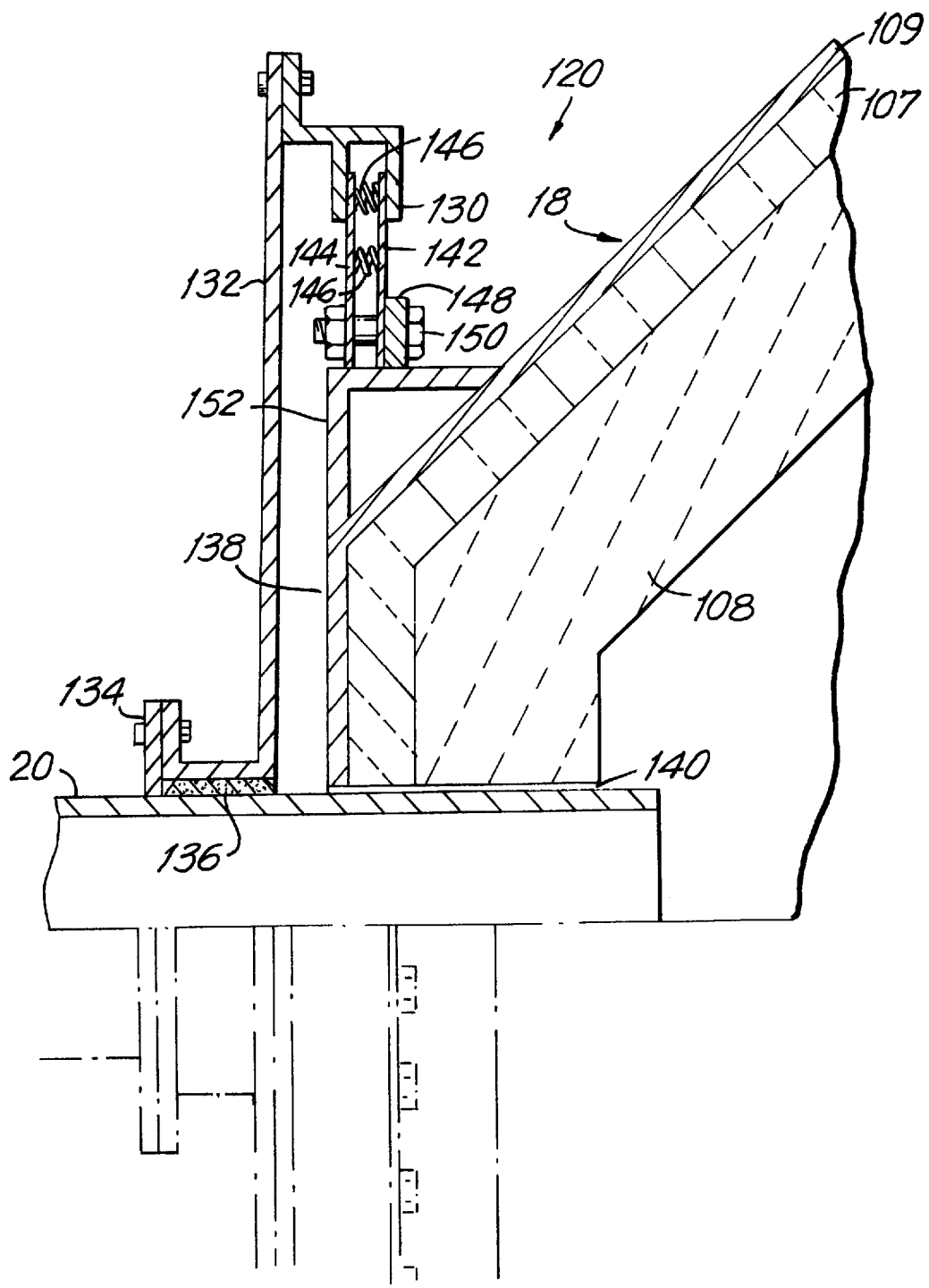
FIG. 3 shows a cross section of a rotary high temperature seal for the charge end of the reactor shown in FIG. 2.

The effectiveness of the seals which are described and claimed in this application, constituting an important feature of the present invention, can be seen comparing the results of two trial runs of the pilot plant (the first with a commercial seal installed and the other with a seal made as shown in FIG. 3).

|  | COMMERCIAL SEAL | | | FIG. 3 SEAL | | |
| --- | --- | --- | --- | --- | --- | --- |
|  | SCMH | (SCFH) | | SCMH | (SCFH) | |
| Gases Produced (except $N_2$) | 574 | (20,279) | 64% | 606 | (21,408) | 94% |
| Nitrogen | 333 | (11,753) | 36% | 36 | (1,263) | 6% |
| TOTAL Gas Produced | 907 | (32,032) | 100% | 642 | (22,671) | 100% |

Although it has been found that about 3 percent of the nitrogen content in the final product gas is originated from the fluff material, it can be seen that an important decrease in the nitrogen content of the produced synthesis gas was made by the unique construction of the inventive seals, which contribute to gas produced having a higher quality and value.

EXAMPLE NO. 3

In order to assess the suitability of the synthesis gases produced according to this invention for the chemical reduction of iron ores, the following material balance was carried out running a computer simulation program specifically devised for said purpose.

The basis for calculations was 1 metric ton of metallic iron produced.

Although the reducing gas produced according to the present invention can be utilized by any of the known direct reduction processes. The material balance was calculated as applied to the HYL III process invented by employees of one of the Co-assignees of this application. Examples of this process are disclosed in U.S. Pat. Nos. 3,765,872; 4,584,016; 4,556,417 and 4,834,792.

For an understanding of this example, reference can be made to FIG. 1 where one of the applications shown is the direct reduction of iron ores, and to Table 1 showing the material balance.

926 Kg (2042 lb.) of fluff are gasified in reactor 18.

recycled as described above as gas stream $F_7$ (being combined with $F_2$, stripped of $CO_2$, and then fed to the reduction reactor as gas stream $F_3$ having the composition shown in Table 1).

Optionally a cooling gas, preferably natural gas, can be circulated in the lower portion of the reactor in order to cool down the direct reduced iron (DRI) before discharging it.

To this end, about 50 NCM (1766 NCF) of natural gas $F_9$ are fed to a cooling gas loop and circulated through the lower portion of the reduction reactor 104. The gas stream effluent from the cooling zone of said reactor is cooled and cleaned at quench cooler 106 and recirculated within said cooling loop.

TABLE 1

Material Balance of the HYL III D.R. Process (of Example 3) Using Synthesis Gas From Gasification of ASR Materials

|  | $F_1$ | $F_2$ | $F_3$ | $F_4$ | $F_5$ | $F_6$ | $F_7$ | $F_8$ | $F_9$ | $F_{10}$ |
|---|---|---|---|---|---|---|---|---|---|---|
| $H_2$ % Vol. | 28 | 35 | 44 | 44 | 33 | 40 | 40 | 40 | 0.4 |  |
| CO | 26 | 33 | 26 | 26 | 14 | 16 | 16 | 16 | 0.1 |  |
| $CO_2$ | 11 | 14 | 0 | 0 | 11 | 13 | 13 | 13 | 0.4 | 100 |
| $CH_4$ | 7 | 10 | 16 | 16 | 13 | 16 | 16 | 16 | 93.7 |  |
| $N_2$ | 4 | 5 | 12 | 12 | 11 | 14 | 14 | 14 | 0.5 |  |
| $C_3H_8$ | 0 |  |  |  |  |  |  |  | 4.6 |  |
| $C_4H_{10}$ | 0 |  |  |  |  |  |  |  | 0.3 |  |
| $H_2O$ | 24 | 3 | 2 | 2 | 18 | 1 | 1 | 1 |  |  |
| Flowrate (NCM) Ton Fe | 1,000 | 785 | 1,876 | 1,876 | 2,023 | 1,687 | 1,400 | 287 | 50 | 297 |
| Temperature (°C.) | 500 | 30 | 40 | 950 | 639 | 30 | 30 | 30 | 25 | 30 |

95 NCM (3354 NCF) of natural gas are fed to burner 49 along with 190 NCM (6709 NCF) of oxygen. Gasification of this amount of fluff produces 1,000 NCM (35,310 NCF) of raw hot reducing gas ($F_1$) which after cleaning and cooling will reduce to 785 NCM (27,718 NCF) with the composition identified as $F_2$.

The thus clean reducing gas then is combined with about 1,400 NCM (49,434 NCF) of recycled gas effluent from the reduction reactor after being cooled by quench cooler 124 and divided as composition $F_7$.

The mixture of fresh reducing gas $F_2$ and recycled gas $F_7$ is then passed through a $CO_2$ removal unit 126, which can be of the type of packed bed absorption towers using alkanolamines resulting in 1,876 NCM (66,242 NCF) with the composition of $F_3$, which clearly is a gas with high reductant potential, of the type normally used in Direct Reduction processes. By means of unit 126, 297 NCM (10,487 NCF) of $CO_2$ are removed from the system as gas stream $F_{10}$. The resulting gas stream $F_3$ is then heated by heater 110 to about 950° C. (1742° F.) and is fed to the reduction reactor 104 as gas stream $F_4$ to carry out the reduction reactions of hydrogen and carbon monoxide with iron oxides to produce metallic iron.

The gas stream effluent $F_5$ from said reduction reactor 104 has consequently an increased content of $CO_2$ and $H_2O$ as a result of reactions of $H_2$ and CO with the oxygen of the iron ore, therefore the effluent gas $F_5$ is dewatered by cooling it in a direct contact water quench cooler 124 to give 1687 NCM (59,568 NCF) of a gas $F_6$. From gas $F_6$ a purge $F_8$ of 287 NCM (10,134 NCF) is split out and removed from the system to eliminate inerts (e.g. $N_2$) from building up in the system and also for pressure control. The rest of the gas is This invention further includes:

1. An apparatus for subjecting feed of organic based waste materials composed of industrial, municipal, or agricultural waste to high temperature volatilization, carbonization and gasification by one or more direct fired process burner operating with a fuel and oxygen firing rate from about stoichiometric, a 1:2 ratio (for natural gas), to a ratio typically about 1:4, and up (to even essentially 100% oxygen), and comprising:

a) An inlet end for feed and an outlet end for gas and solid residue, apparatus conveying said feed from inlet end to outlet end for discharging;

b) A device for feeding organic material into apparatus through water or air cooled feed nozzles by a compression force caused by hydraulic or mechanical ram or screw;

c) At least one process burner introduced through the outlet end;

d) Two or more on-board thermocouples which project through apparatus walls and refractory and are exposed to direct temperature of residue and atmospheric gases;

e) A hearth having sufficient volume to retain a reactive bed of solid organic materials and spent residue within the high temperature atmosphere of the hearth for a period of one or more hours;

f) The receiving of organic feed material from said inlet end, and the said process burner flame projecting into said apparatus from said outlet end, thus providing counter-current flow of bed of reacting materials and spent residue relative to projection of said burner flame into said apparatus; and wherein said bed of spent solid residue discharges from said outlet end in a co-current direction of flow of hot process gases which exit through said outlet end; and said bed of spent residue discharges from said outlet end through a hot classifier which separates coarse solid residue from fine solid residue for subsequent recovery of coarse fraction which contains recyclable metals;

g) At least one, and depending on requirements for particle size classification, two or more outlet chutes for said solid residue;

h) An outlet end collection device sealed from undesirable reactions by atmospheric air for removal of hot residue solids and process gas;

i) Outlet end discharge chute for classified residue solids discharging fine solid residue through a hot rotary dump valve and coarse solid residue through one or more water seals;

j) Outlet end discharge chute (with atmospheric sealing rotary dump valves) for discharging classified fine solid residue into a solids cooler;

k) Outlet end discharge chute(s) (with atmospheric seals) discharging hot classified coarse solid residues into one or more cooler(s).

2. An apparatus according to item 1 above, in which sizing of feed material is restricted only by the compressibility limits of the organic feed material relative to the cross sectional area of the feed nozzle.

3. An apparatus feed nozzle for solids according to item 1 above, in which the feed nozzle and the compressed feed material serve to seal atmospheric air out of apparatus and to prevent apparatus gases from escaping into the external atmosphere.

4. An apparatus according to item 3 above, which contains onboard thermocouples which are installed through the apparatus walls and refractory and are directly exposed to the hot gaseous atmosphere and solid residual material contained inside apparatus and serves to monitor and to provide signals for controlling the firing rates of the principal process burner.

5. An apparatus according to item 4 above, in which the volumetric retention of the bed of organic feed material solids is adjustable according to the time needed to properly gasify richer or leaner organic bearing materials by adjusting the conveying speeds of said apparatus.

6. An apparatus according to item 5 above, in which the cross sectional area of the outlet end threshold is sufficient to permit the exit of hot process gases and solid residue to flow out of the said apparatus with the gas velocity being low enough to permit partial pneumatic separation of the very fine solid particles from coarser solid particles. The very fine particles become entrained in said process gas stream and exit with the process gas through the gas ducts for subsequent removal from synthesis gas product. The plus 200 mesh solid particles generally remain with the coarser solids mass and exit, through the solids collection chutes:

a) And wherein, the side walls, forming the cross sectional area of the outlet threshold, expand in increasing cross sectional area away from said threshold at an angle which proportionally approximates the expansion of the cross sectional area of the flame front from the primary process burner for a distance which approximates the length of said flame front;

b) And wherein, said expanding side walls, from said outlet threshold, connect with parallel sides which form the hearth area of said apparatus and whose lengths are determined by the bed volume capacity needed in the hearth area to accommodate approximately 45% to 50% of the total hearth bed volume capacity;

c) And wherein, the inlet cross sectional area is two or more times the diameter of the inlet feed nozzle;

d) And wherein, the side walls, forming the cross sectional area of the back wall of said apparatus inlet end, expand in increasing cross sectional area from the back wall of said inlet toward the outlet end of said apparatus and connect with the parallel sides which form the hearth area.

We claim:

1. Apparatus for gasifying a charge containing significant amounts of organic materials to produce a synthesis gas, said apparatus comprising:

(a) a rotary reactor having a substantially horizontal axis of rotation with a refractory lining and with respective openings only at a charge end and at an opposing discharge end;

(b) a reactor charging device operative to feed the organic material containing charge through the opening at the charge end of the reactor in a manner to atmospherically seal the latter opening;

(c) a reactor-rotating drive for tumbling materials charged within said rotary reactor whereby such materials are mixed and caused to move, by effect of such tumbling action and by the volumetric displacement in the bed of added materials charged into said reactor, from said charge end to said discharge end;

(d) at least one flame-projecting continuous burner having a fuel supply and an oxygen-containing gas supply and any such burner being located at and directed into said reactor, only through its discharge opening, to above the bed formed of any of such materials charged therein and being capable of producing heat sufficient to pyrolyse and gasify organic materials present inside said reactor by combustion of supplied fuel with supplied oxygen-containing gas; and (e) reactor seals substantially isolating the interior of said reactor.

2. Apparatus according to claim 1, further comprising a gas collecting structure in communication with the otherwise essentially gas-sealed interior of said reactor via said discharge opening wherein any synthesis gas exiting the interior of said reactor is collected and conducted away for further disposition.

3. Apparatus according to claim 2, comprising said reactor having a shape symmetrical about its axis of rotation as though generated by rotation about said axis by a bowed line genetrix and thus defining tapered walls converging from a wide waist to narrowed ends resulting in said reactor having a greater diameter centrally relative to either end so as to contain a bed of material therein with a depth largely determined by said discharge opening.

4. Apparatus according to claim 3, wherein said burner is mounted to be adjustably positioned relative to the inside of said reactor.

5. Apparatus according to claim 4, wherein at least half of the interior of said reactor is of generally increasing cross-sectional area in the direction away from said burner.

6. Apparatus according to claim 2, wherein said charging device comprises an auger.

7. Apparatus according to claim 2, wherein said charging device comprises a ram feed system.

8. Apparatus according to claim 7, wherein said feed system comprises a hydraulic ram to compact and force feed said materials into a feed tube and a second ram to force the compacted material along the feed tube into said reactor in a manner such that the compacted charge within said tube seals the charge end opening against the atmosphere.

9. Apparatus according to claim 2, further comprising a secondary burner being supplied by at least an oxygen-containing gas, being positioned in said gas collecting structure outside said reactor and being capable of producing heat to pyrolyse residual organic material or carbon particles entrained in the synthesis gas effluent from said reactor.

10. Apparatus according to claim 3, further comprising a secondary burner being supplied by at least an oxygen-containing gas, being positioned in said gas collecting structure outside said reactor and being capable of producing heat to pyrolyse residual organic material or carbon particles entrained in the synthesis gas effluent from said reactor.

11. Apparatus according to claim 10, wherein said feed system comprises a hydraulic ram to compact and force feed said materials into a feed tube and a second ram to force the compacted material along the feed tube into said reactor in a manner such that the compacted charge within said tube seals the charge end opening against the atmosphere.

12. Apparatus according to claim 2, further comprising a gas-extracting fan connected with said gas collecting structure, and the positioning and shape of the reactor relative to the burner being such that any gases evolved within the reactor are caused to intermingle sufficiently with gasification reactants produced by said burner to react effectively therewith.

13. Apparatus according to claim 11, further comprising a gas-extracting fan connected with said gas collecting structure, and the positioning and shape of the reactor relative to the burner being such that any gases evolved within the reactor are caused to intermingle sufficiently with gasification reactants produced by said burner to react effectively therewith.

14. Apparatus according to claim 2, further comprising a residual ash particle classifier located at the discharge end of said reactor.

15. Apparatus according to claim 2, further comprising particle separator/cleaner and cooler/dewatering apparatus.

16. Apparatus according to claim 13 further comprising particle separator/cleaner and cooler/dewatering apparatus.

17. Apparatus for gasifying a charge containing organic materials to produce a synthesis gas, said apparatus comprising:

a) a rotary reactor having respective openings only at a charge end and at an opposing discharge end, and a hearth having a barrel-shaped volume defined by a generally conical tapered wall converging from the mid-portion of said reactor towards said discharge end and said charge end, adapted to retain a bed of solid organic materials and residue within a high temperature atmosphere;

b) a device for feeding said charge containing organic materials through the opening at the charge end of the reactor in a manner to atmospherically seal said opening at the charge end;

c) at least one projecting burner entering said reactor through said discharge opening whereby the flame produced by said burner by combustion of oxygen and a suitable fuel within said reactor heats and pyrolyses the organic materials in said charge;

d) a reactor-rotating drive for causing said reactor to rotate whereby said charge containing organic materials is tumbled within said rotary reactor and is moved from said charge end to said discharge end;

e) a discharge device located at the discharge end of said reactor and being capable of separately discharging said residue from said reactor concurrently with the stream of hot synthesis gas produced in the reactor and directing the synthesis gas and said residue away from said reactor for its further processing of disposal; and f) sealing means between said rotary reactor and said charging device at the charge end and between said rotary reactor and said discharge device at the discharge end to prevent access of atmospheric air into said reactor and also to prevent escape of synthesis gas therepast out of said reactor.

18. Apparatus for gasifying a charge containing organic materials to produce a synthesis gas, according to claim 17, wherein said reactor rotates about a horizontal axis.

19. Apparatus for gasifying a charge containing organic materials to produce a synthesis gas, according to claim 17, wherein said burner is mounted to be adjustable positioned relative to the inside of said reactor and to the surface of said bed.

\* \* \* \* \*